United States Patent [11] 3,555,208

[72] Inventor Wolfgang Arndt
Ludwigsburg, Germany
[21] Appl. No. 738,360
[22] Filed June 19, 1968
[45] Patented Jan. 12, 1971
[73] Assignee International Standard Electric Corporation
New York, N.Y.
a corporation of Delaware
[32] Priority June 23, 1967
[33] Germany
[31] 1,512,993

[54] CIRCUIT ARRANGEMENT TO CHECK A SECTION OF A SWITCHING NETWORK
2 Claims, 3 Drawing Figs.

[52] U.S. Cl. .......... 179/175.23, 179/18
[51] Int. Cl. .......... H04m 3/24
[50] Field of Search .......... 179/18BT, 175.23, 175.25

[56] References Cited
UNITED STATES PATENTS
2,295,187 9/1942 Spencer .......... 179/18
3,430,000 2/1969 Roehrig .......... 179/18
3,443,034 5/1969 Schoenemeyer et al. .......... 179/18

*Primary Examiner*—Kathleen H. Claffy
*Assistant Examiner*—Douglas W. Olms
*Attorneys*—C. Cornell Remsen, Jr., Rayson P. Morris, Percy P. Lantzy, J. Warren Whitesel and Delbert P. Warner

ABSTRACT: This common control telephone network provides an inherent system for checking the most recently operated switching path of sections of the control network for malfunction. A first potential, the idle marking potential is applied to all output terminals of a first stage of the control network. A second potential is applied from the network input to seize the path such that on completion of a switching-through operation, a second marking potential appears at the output terminal of the switched path. A detecting circuit employing transistors senses the potential at the output terminal and thereby can determine when the switching path or any portion of it has malfunctioned, or is improperly held when it should have released.

CIRCUIT ARRANGEMENT TO CHECK A SECTION OF A SWITCHING NETWORK

Figure 1:
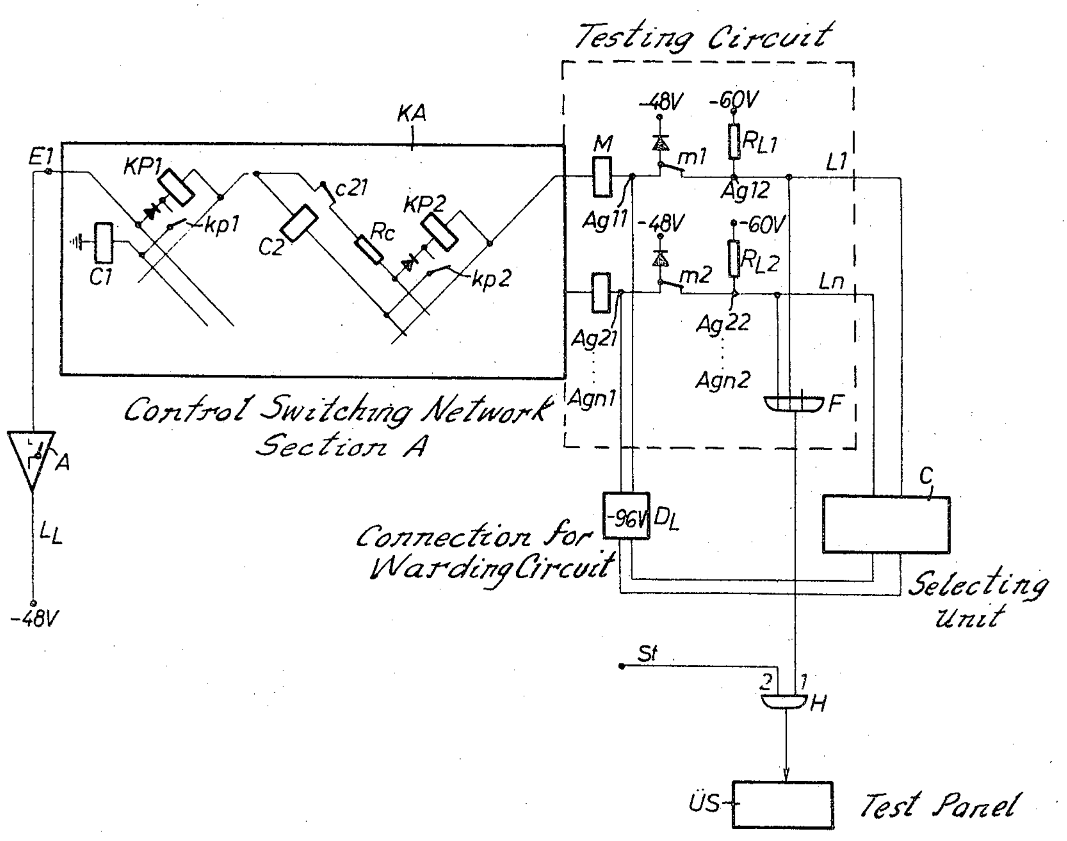

The invention relates to a circuit arrangement to check a section of a multiple stage telephone switching network with a single-wire control network wherein at each output of the control network in the idle condition, a defined idle marking appears and wherein in the holding circuit of a through-connected or completed path to a defined output or when marking said output, a potential becomes effective which differs from the idle marking and which is transmitted over the path previously marked by the idle marking.

Switching sections of a multiple stage switching network are understood to be such network sections in which only one single connecting path is possible between a defined input and a defined output.

U.S. Pat. No. 3,483,516, proposes a crossbar switching system with a crosspoint arrangement in which, with the aid of a single-wire control network, led in parallel to the speech wires and imitating said speech wire network, all processes necessary to establish a connection within a section of the switching network are carried out. At the commencement of establishing a connection within such a section of the switching network marginal-current circuits are formed at the corresponding input, in order to determine the available outputs across all switching elements concerned. After having selected an idle output a starting circuit is established across the switching elements leading to said output and a holding circuit to hold said switching elements operative.

A completed connection between an input and a selected output of a section of the switching network is defined as a being faulty, however, if not all switching elements such as the link relays serving to indicate the seizure, have responded. Disadvantageous consequences for establishing a connection can be widely avoided by a due time recognition of a fault or malfunction.

Furthermore, it is known from the U.S. Pat. No. 2,668,195 to series-connect in a crosspoint arrangement two sections of a multiple stage, switching network, to interconnect their control networks across coincidence circuits for a conjugated route search over both sections and to determine a connecting path by means of a coincidence circuit having responded.

It is the object of the invention to provide a circuit arrangement with the aid of which the proper switching condition of a section of the switching network can be checked in that at each output conductor of the single-wire control network a defined idle marking appears in the idle condition, and in that a holding circuit of a completed connection of a voice path to a defined output produces a second potential appearing at the output is effective differing from the idle marking and making its way over said idle marking.

It is another object of the invention to provide an inherent or self-checking system whose self-checking output may be fed to any conventional fault indicator such as a visual or audible signal.

It is a still further object of the invention to provide a common control telephone system in which each control switching section of a multiple section system can be checked for malfunctioning of parts by merely inserting a condition sensor at the checking output.

It is a still further object of the invention to provide a common control telephone switching system in which the various conditions of the switching elements may be checked to determine the correctness of their response.

The problem is solved, according to the present invention, that the idle marking and the other potential appears at two different terminals between which terminals a switching device or set of contacts is arranged, separating both terminals in the completed connected condition of the respective voice path and that a checking unit, being connected after establishing a completed connection to the path, supervises the existence of idle marking at the first terminals of all outputs. This solution, moreover, shows the advantage that the testing or checking can be made without additional expenditure in the switching network, using the already existing facilities which are used e.g. during the marking process for the route search and for indicating the busy condition.

The invention is explained with the aid of examples, shown in the FIGS. 1 and 2.

In FIG. 1 a marking potential of −48V is applied e.g. to the input E1 of the control network via a contact tree A at the beginning of a route search through a section of switching network KA. Said potential of −48V passes through the switching network and reaches all idle output terminals Ag12... Agn2, to which output terminals a potential of −60V is applied via resistors Rl1... RLn, said potential being the idle marking. This potential difference passes a current through the switching elements or contacts which current however is not sufficient to cause said elements to operate. The marking potential appearing at the outputs Ag12... Agn2 reaches a selecting unit C (this unit containing the further stages of the switching network) from all marked outputs via a line L1... Ln. After having selected one of the outputs Ag12... Agn2 an order is forwarded for further connection from the connection forwarding circuit, indicating and idle further stage, DL(with a voltage of −96V) to the output selected, e.g. to output Ag12. After actuating the switching elements the through-connecting potential and the contact tree A are disconnected from the marking potential source of −48V in a way not shown herein.

FIG. 1 shows the switching elements used for checking only in their function as such checking or testing elements.

The holding circuit between input E1 and output Ag11 is established from ground potential via a column relay C1, a contact *kp*1 of the crosspoint element *kp*1 having responded, the column relay *c*2 which disconnects with the aid of its contact *c*21 the path going to other outputs via R*c*, the contact *kp*2 of the element KP2 and via the seize-relay M and a diode to −48V. Contact *m*1 separates the connection between the two output terminals Ag11 and Ag12 so that at the terminal Ag12 the idle marking of −60V is again effective.

As soon as the connection is completed through the network section and the marking potential of −48V is removed from the input E1 the testing process is started as follows: an AND-circuit H is actuated via a control line ST which AND-circuit is connected over its second input and eventually an OR-circuit F with all outputs Ag12... Agn2. If all switching elements along said path have properly responded through their contacts (in the example: *kp*1, *c*21, *kp*2 and *m*1) the idle marking is applied to all output terminals Ag12... Agn2. If however, in case of a fault, e.g. contact *m*1 of the seized output Ag11 is closed, even after the connection completed through the section the holding potential, applied across relay C1 viz the ground potential becomes effective and makes its way in place of the idle marking of −60V over the resistor RL1 being high-ohmic in respect to the excitation windings and said holding potential reaches the AND-circuit H via the OR-circuit F. Said AND-circuit intermeshes both informations "-testing process" (via the line ST) and "no idle marking" (e.g. at Ag12) to the information "fault" which information appears at the output US.

The cause that contact *m*1 is closed may be in a defined case that the control network of the switching network shows a short circuit to ground, in consequence of which an excessive current flows over the relay M. The break-contact *m*1 returns in case of an excessive current into its nonoperative position "closed" by an excessive compensation of a permanent magnet with the aid of which the contact position is established.

Quite another, possible fault would be e.g. that the contact *c*21 does not open. Consequently the holding potential reaches across the corresponding column of the arrangement, other, idle outputs Ag22... Agn2, their preceding relays M2... M*n* having not responded previously, which also causes via the OR-circuit F and the AND-circuit H the faulty information "-marking" during the testing or checking process.

Figure 2A:
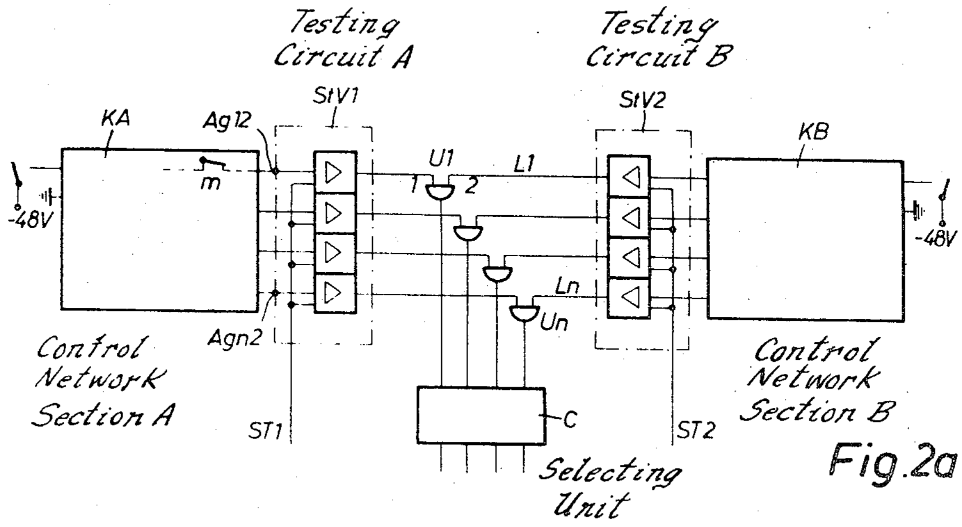

FIG. 2*a* shows an arrangement wherein the control networks of two switching networks KA and KB are connected with the selecting unit C through lines L1... L*n* via an AND-circuit each U1... U*n*. These AND-circuits U1... U*n* take over the function of the AND-circuit H mentioned in the first example during the separately carried out testing processes for the networks KA and KB.

When testing the switching network KA the potential applied to the output Ag12... Ag*n*2 reaches, via the circuit STV1, the input 1 of the AND-circuit U1, whereas the potential "testing process" is led to the input 2 of the AND-circuit U1 via the control line ST2 and the circuit STV2.

Figure 2B:
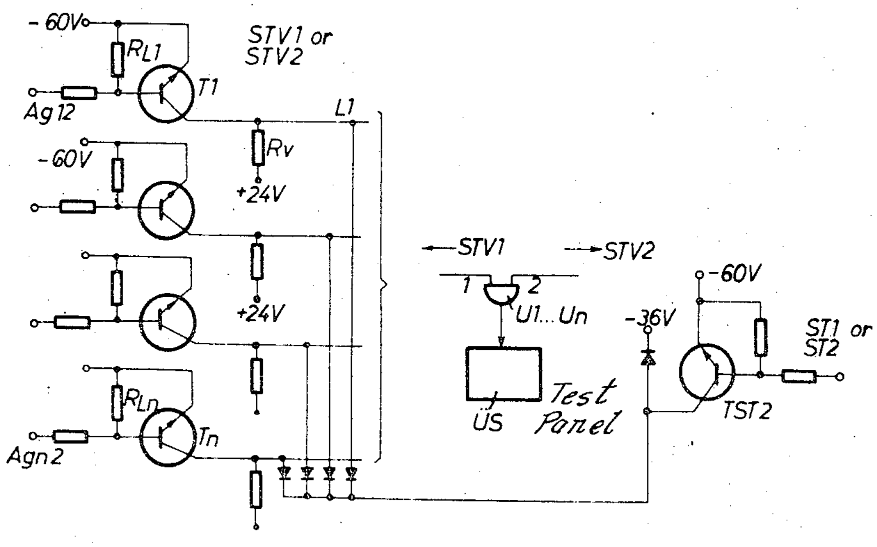

FIG. 2*b* shows the similarly designed circuit arrangements STV1 and STV2, respectively.

If the output Ag12 of the switching network section KA is seized and the contact *m*1 of the seize-relay M1 opens the idle marking of − is applied to the base of transistor T1 of the circuit arrangement STV1 and said transistor T1 is nonconductive. The potential −36V is applied to the input 1 of the AND-circuit U1 via diodes of the circuit arrangement STV1 and STV2. Transistor TST2 in the circuit arrangement STV2 is rendered conductive via the control line ST2 and the potential "testing process" (−60V) reaches, coming from the circuit arrangement STV2, the input 2 of the AND-circuit U1 via the line L1. These two criteria, i.e. −36V from STV2 applied to the input 1 and −60V from STV2 applied to the input 2 of the AND-circuit U1 result in the information "A12 properly seized" at the output US of the AND-circuit U1 (U1 blocked).

But if an erroneous connection is completed through the section, i.e. if one or several of the transistors T1... T*n* are conductive during the testing process (marking potential or holding potential applied to Ag12... Ag*n*2) the potential −60V reaches, via the emitter-collector path of the transistor or the transistors T1... T*n* of the circuit arrangement STV1, the input 1 of the AND-circuit U1... U*n*. Release potential (−60V) is applied, via the control line ST2 as already described above, to the AND-circuits U... U*n* for the testing process and at the output US (U1 or U1... U*n* released) appears the information "fault."

In this circuit arrangement, too, already existing switching elements are used advantageously for testing or checking a section of the switching network. The switching network section KB is tested in the same way like the section KA, whereby in this case the release potential for the testing process is applied, via the control line ST1, to the input 1 of the AND-circuits U1... U*n* after the transistor TST2 in the circuit arrangement STV1 has been rendered conductive and the outputs of the section KB to be tested are connected to the inputs 2 of the AND-circuits U1... U*n* via the circuit arrangement STV2.

I claim:

1. In a multiple stage switching network, a switching control system including a plurality of output terminals each corresponding to one control switching path, a marking potential source connected in multiple to said terminals, a second potential source, at least one switching control means in each of said switching paths, contacts of each of said switching control means interposed in said switching paths, means for applying an operating potential to one of said switching paths to seize said path for subsequent operation of the switching means within the seized switching path, and for transmitting said operating potential to the output terminal of said switching path, potential sensing means connected to said output terminals to sense the potential at the output terminal of the switched path corresponding to the condition of the switching means in said path.

2. A telephone network as claimed in claim 1, wherein said potential sensing means comprises a multiple input AND circuit, with a first of the inputs to said AND circuit derived from output terminals and another of said inputs being a test input.